United States Patent [19]

Calvert et al.

[11] Patent Number: 4,534,755

[45] Date of Patent: Aug. 13, 1985

[54] CENTRIFUGES

[75] Inventors: Colin Calvert, Ampthill; Peter Cox-Smith, Bletchley, both of England

[73] Assignee: Hoccum Developments Limited, Slough, England

[21] Appl. No.: 468,562

[22] Filed: Feb. 22, 1983

[30] Foreign Application Priority Data

Feb. 22, 1982 [GB] United Kingdom ................. 8205209

[51] Int. Cl.[3] ............................................. B01D 21/26

[52] U.S. Cl. ........................................ 494/37; 494/47; 494/84

[58] Field of Search ..................... 494/37, 45, 84, 7, 8, 494/9, 11, 43, 47; 310/113; 210/360.1; 422/72

[56] References Cited

U.S. PATENT DOCUMENTS 4,046,316 9/1977 Hein ...................................... 494/84
4,078,719 3/1978 Howard ................................ 494/37
4,241,866 12/1980 Giesbert ................................ 494/84
4,397,637 8/1983 Place ...................................... 494/1

FOREIGN PATENT DOCUMENTS 1374023 11/1974 United Kingdom .

*Primary Examiner*—Robert W. Jenkins
*Attorney, Agent, or Firm*—Klarquist, Sparkman, Campbell, Leigh & Whinston

[57] ABSTRACT

A centrifuge comprises a rotor which tapers conically downwardly from a maximum diameter upper region to a central bottom opening through which a liquid entry pipe projects upwardly. An outlet end of the entry pipe is shrouded by a concentric cone which is mounted for rotation with the rotor. A flexible diaphragm is secured to the outlet end of the pipe and extends towards the cone so that liquid entering the rotor is directed to flow over an inwardly facing surface of the cone. By this means, the spin of the rotor is transmitted immediately to the liquid. During operation of the centrifuge, rapid changes in the rate of rotation of the rotor are effected so that solids which have separated from liquids in the rotor and have accumulated in the upper region are dislodged therefrom.

3 Claims, 3 Drawing Figures

CENTRIFUGES

BACKGROUND OF THE INVENTION

1. Field of the Invention

This invention relates to a centrifuge and to a method of operating same.

2. Brief Description of the Prior Art

Centrifuges are employed to separate a mixture comprising solids suspended in a liquid in order to clean the liquid. In operation, the liquid rotates with a rotor of such centrifuges and denser solids collect on the inner peripheral wall of the spinning rotor. The efficiency of operation of the centrifuge depends upon the liquid attaining a sufficiently high angular velocity, which requires the centrifuging rotor to be rotated at high speed. Since the rotary motion is wholly or mainly transmitted through the liquid by its own viscosity, the liquid is only gradually speeded up and, as it enters the rotor, its rate of flow through the rotor may have to be limited to ensure it attains sufficient angular velocity for efficient separation of the solid material from it by the centrifuging action.

Known centrifuges are normally arranged to operate with a continuous flow of liquid through the bowl or rotor, but the collected solids must usually be removed manually. This has many disadvantages, not least the fact that the apparatus is put out of use for considerable periods unless a system of replacement rotors is employed. Mechanisms have therefore been proposed for the automatic removal of the solids. In these mechanisms a member is inserted into the bowl to scrape or suck the accumulated deposits from its peripheral wall. Such mechanisms are vulnerable to damage and can add considerably to the complexity of the design; if they are permanently located within the centrifuge bowl they can disturb the liquid flow there and reduce the efficiency of separation.

SUMMARY OF THE INVENTION

According to one aspect of the invention, there is provided a liquid centrifuge comprising a hollow rotor having a radially inner region, a concentric shroud rotating with the rotor and surrounding an inlet for a flow of liquid carrying suspended solids, the shroud being open at least at one end to communicate with the radially outer region of the rotor interior, and said liquid inlet being arranged to discharge the liquid into the shroud close to the inner peripheral wall thereof.

In this manner, the acceleration of the liquid does not depend solely upon the rotation of the outer wall of the rotor, but it emerges from said inlet close to a spinning surface and can accelerate rapidly as it flows over that surface in its passage to the radially outer region of the rotor.

Preferably the shroud has a frusto-conical configuration, widening to an open discharge end. In another preferred feature, a displaceable, i.e. flexible, member is provided between the inlet and the shroud that provides a variable restriction for the liquid flow, whereby the liquid which emerges from the inlet passes in a relatively thin layer flowing over the adjacent surface of the shroud.

According to another aspect of the invention, there is provided a centrifuge for separating a mixture comprising solids suspended in a liquid, the centrifuge including a rotor which defines a space and which is mounted for rotation about an axis, a duct which extends into the space for the passage of the mixture into the rotor, and an element which shrouds an outlet end of the duct in the space and which is mounted for rotation about the rotor axis in the same direction as the rotor so that, when the centrifuge is in use, rotation of the element accelerates the process whereby liquid entering the rotor is caused to rotate with the rotor.

According to another aspect of the present invention, there is provided a liquid centrifuge comprising a hollow rotor mounted on an upright axis, and means for supplying a liquid carrying suspended solids into the hollow rotor through a lower region thereof, the rotor having upper outlet means for the liquid after separation of the solids and bottom outlet means for the separated solids at said lower region, a drive arrangement for the rotor comprising control means arranged to produce rapid changes of the speed of rotation of the rotor whereby to loosen the collected solid material and cause it to fall from the peripheral wall of the rotor through said bottom outlet means.

In such a construction it is convenient to have a drive motor above and coaxial with the rotor.

The lower, open discharge end of the rotor may project into a collecting hopper for the displaced solids, and the inlet liquid may be led through a pipe that passes upwardly to the hopper into the rotor.

According to another aspect of the invention, there is provided a method of operating a centrifuge comprising the steps of passing a suspension containing a less dense and a more dense material into a rotor of the centrifuge, rotating the rotor in one direction so that the more dense material separates from the less dense material to accumulate on an inwardly facing surface of the rotor, and, when the more dense material has accumulated in this manner, causing a rapid change in the rate of rotation of the rotor to dislodge the accumulated more dense material from the inwardly facing surface, thereby to facilitate the removal of said more dense material from the rotor.

BRIEF DESCRIPTION OF THE DRAWINGS

An example of a centrifuge and a method of operating same will be described with reference to the accompanying drawings, in which.

DESCRIPTION OF THE PREFERRED EMBODIMENTS

Figure 1:
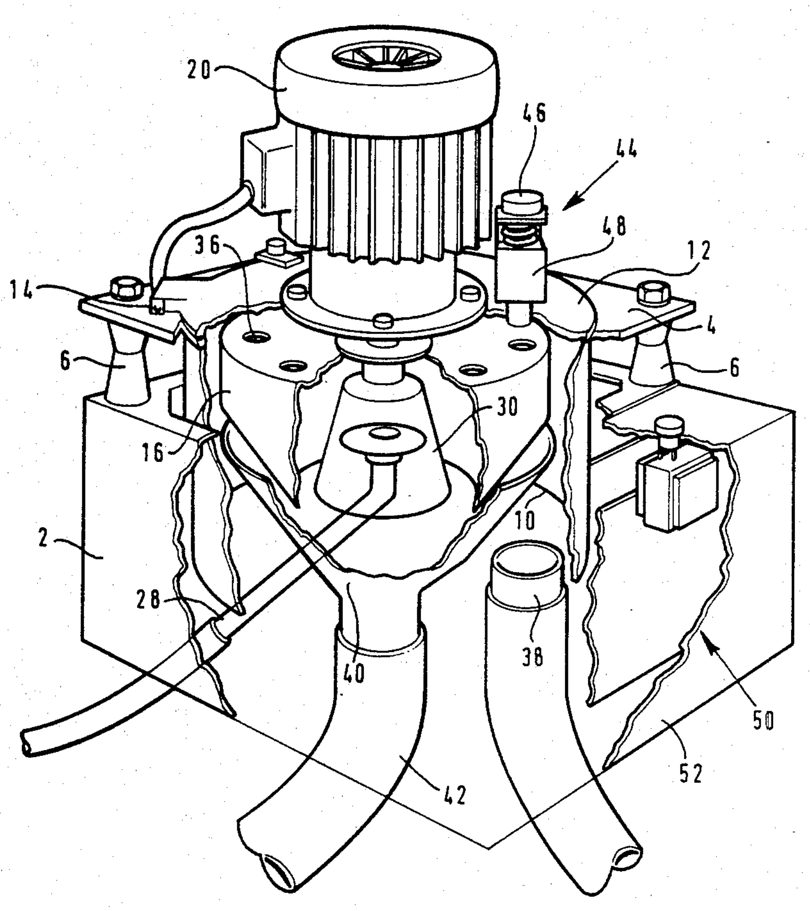
FIG. 1 is a cut-away perspective view of the centrifuge.
Figure 2:
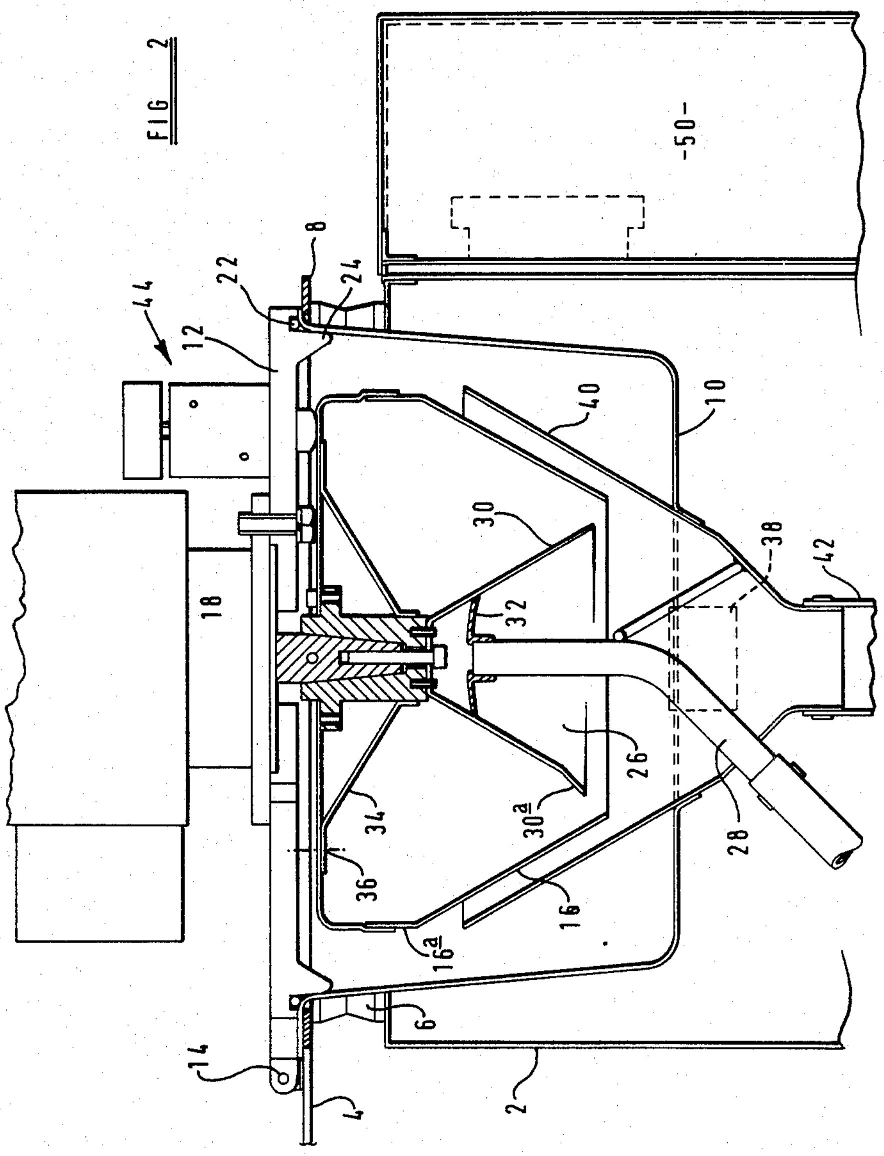
FIGS. 2 and 3 are axial sectional and plan views respectively of the centrifuge.
Figure 3:
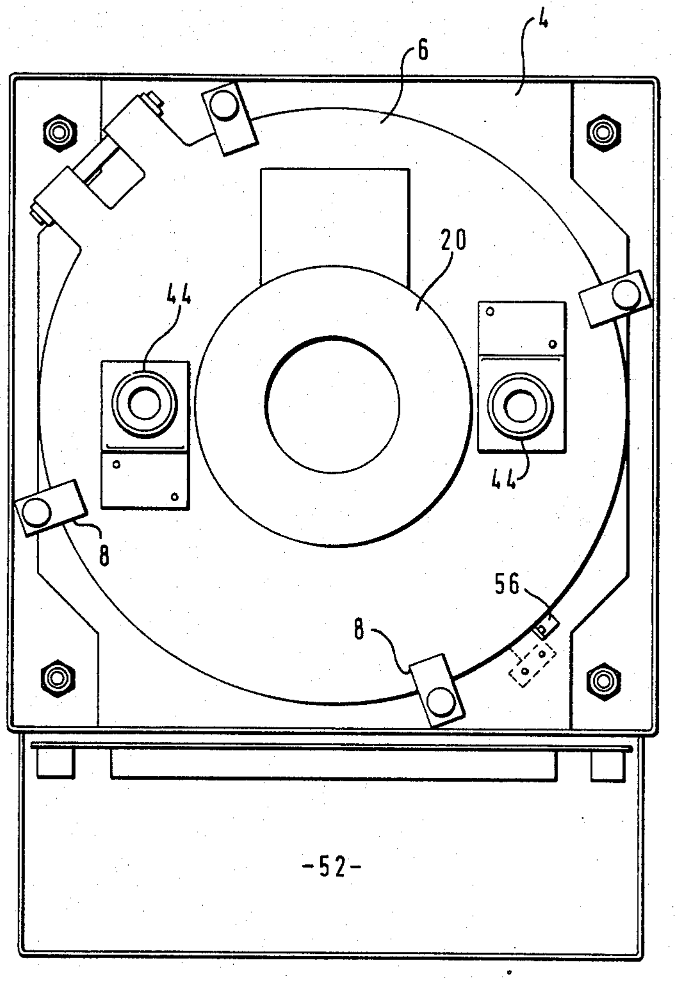

Referring to the drawings, on a base 2 of the centrifuge a mounting platform 4 is supported through anti-vibration mountings 6. Secured by clamps 8 to the underside of the platform is a static outer container 10 surrounding a central opening of the platform covered by a lid 12 connected to the platform by hinge means 14. Mounted concentrically within the outer container 10 is an inner container comprising a hollow rotor 16 suspended below the lid 12. The rotor is suspended from a vertical drive shaft 18 of a motor 20 bolted onto the hinged lid 12. The drive shaft defines an axis of rotation of the rotor which is generally vertical, at least when the lid is closed. FIG. 2 shows an O-ring seal 22 which is provided between the lid and the rim of the outer container 10, and the lid has a peripheral lip 24 lying close to the seal to deflect centrifuged material away from it.

The centrifige comprises a duct in the form of an entry pipe 28 which extends into the space defined by the rotor 16 for the passage of fluid into the rotor. An element in the form of a cone 30 shrouds an outlet end of the pipe and is mounted for rotation about the axis of rotation of the rotor, being mounted for rotation with the rotor. The cone defines a path for the passage of fluid in the rotor, which path extends from the outlet end in a direction away from an upper region of the rotor where, during operation of the centrifuge, denser material which has been separated from the fluid accumulates. The cone extends continuously around the outlet end of the duct circumferentially about the rotor axis and provides a surface of said path which diverges from the rotor axis along the length of the path. A part of the pipe 28 provides a surface of the path which faces generally radially outwards.

The centrifuge comprises a guide means in the form of a flexible diaphragm 32 which extends from the pipe adjacent to the outlet end thereof towards the inwardly facing surface of the cone to guide liquid which has passed from the duct towards the cone. The diaphragm acts as a valve to prevent liquid which has passed the diaphragm in a generally downwards direction from returning into the pipe 28.

The rotor tapers conically downwardly from a maximum diameter upper region 16*a* to a central bottom opening 26 through which the liquid entry pipe 28 projects upwardly into the concentric entry cone 30 which forms part of the rotor and which shrouds the inlet from the pipe 28. The flexible diaphragm 32 is secured to the outlet end of the entry pipe and, when the rotor is static, seals against the inside of the cone. In an upper region thereof, the rotor is reinforced by a frusto-conical shield plate 34. A series of openings 36 extend through the radially outer margin of the shield plate and a top wall of the rotor to communicate with the container space outside the rotor. These openings serve as outlets to the outer container 10 for centrifuged liquid after denser solid material carried by the entry flow has been separated from the liquid and deposited on the inside wall of the rotor, wholly or mainly in its maximum diameter upper region 16*a*. Although not shown, the openings 36 can be formed to face outwards as well as upwards to assist the flow through them.

The separated liquid leaves the outer container through an offset bottom outlet 38. Solids collected on the inside wall of the rotor can be removed, in a manner to be described below, to fall into a fixed hopper cone 40 surrounding the open bottom end of the rotor and be led away through waste pipe 42.

Mounted on the lid at diametrically opposite positions on each side of the motor 20 are two friction brakes 44, each comprising a brake pad that can bear upon the top face of the rotor near its outer diameter. The pad can be held off the rotor by energising a solenoid 48 of the brake, but bears on the rotor under gravity when the solenoid is switched off. The brakes may also be manually operated by depressing a spring top cap 46. The operation of the motor 20 and the solenoid control of the brakes 22 is effected through an electronic control unit 50 in enclosure 52.

In the centrifuge mode, as the rotor is spun at high speed by the electric motor, a supply of liquid carrying solid materials in suspension is fed through the pipe 28, past the diaphragm 32 and through the entry cone 30 into the main region of the rotor. The diaphragm is flexed away from the entry cone wall by the liquid pressure differential acting on it, but is has the effect of forcing the incoming liquid to flow over the shrouding wall of the cone in a relatively thin layer. The liquid is therefore subjected to strong viscous drag forces as soon as it emerges from the entry pipe so that the spin of the rotor is transmitted immediately to it. The entry cone is generally frusto-nonical about the rotor axis, being wider at the axially lower end thereof. The rapid movement of the flow out of the shrouding entry cone from an open axially lower end thereof is assisted by its sharply divergent form, and the lower region of the cone may also be flared outwards, as illustrated at 30*a* in FIG. 2, which has the additional effect of guiding the flow close to the outer peripheral wall of the rotor. Little solid material will tend to collect on the divergent rotor surfaces, the main deposit being on the walls in the upper region 16*a*.

It will be noted that liquid bearing entrained solid material flows from the entry cone onto the peripheral wall of the rotor 16 adjacent to a lower end of that wall and leaves the rotor adjacent to an upper end of the peripheral wall, being caused to flow upwardly along the upwardly divergent internal surface of the peripheral wall by centrifuging action of the rotor when the rotor is rotated at high speed. It will be apparent that the liquid will not flow from the entry cone onto the peripheral wall of the rotor and then upwardly along that wall when the rotor is at rest or is turning only slowly.

The centrifuge can be operated in a manner to facilitate the removal of a more dense material which has been spearated from a less dense material in the rotor of the centrifuge. During operation of the centrifuge, when a quantity of the more dense material has accumulated on an inwardly facing wall of the rotor, in particular on the inwardly facing wall of the part 16*a*, a rapid change is effected in the rate of rotation of the rotor in order to dislodge the accumulated material. The rapid change is usually a rapid deceleration which can be applied positively to the rotor for a period which is sufficient for the rotor to be caused to rotate in the opposite direction to the initial direction of rotation thereof. Material which has been dislodged from the inwardly facing wall by this method drops in a generally axial direction to a lower region of the rotor and is led from the rotor through a duct in the form of a waste pipe 42.

When it is required to remove the accumulated solids from the rotor walls, the rotor is stopped or nearly stopped by brakes 20 so that loose material will no longer be held against the walls. Adherent material can be shaken off by use of the motor, e.g. in accordance with a pre-programmed sequence operated by the control system 50, to reverse the rotor or cause it to change speed suddenly.

This cleaning operation can be arranged to be actuated at pre-programmed time intervals by the control system 50. Alternatively, there is described in a co-pending application, (Case B) filed simultaneously herewith, a form of control that senses the inertia of the rotor and, when sufficient deposit has accumulated to increase the inertia above a predetermined limit, a cleaning operation is initiated.

If it is required to have access to the rotor interior for cleaning or maintenance, it is a feature of the illustrated construction that this can be done by simply raising the hinged lid, and with it the rotor including the entry cone. For safety, a latch 56 between the lid and the platform is also controlled by the control system 50 which comprises means, also described in the co-pending application (Case B), to sense when the rotor has stopped or almost stopped before releasing the latch.

We claim:

1. A method of operating a centrifuge, the method comprising a separating stage and a solids removal stage, wherein the separating stage includes passing a suspension containing a less dense and a more dense material into the rotor of the centrifuge, and rotating the rotor in one direction so that the more dense material separates from the less dense material to accumulate on an inwardly facing surface of the rotor, and wherein the solids removal stage commences when the more dense material has accumulated in this manner, sequence of deceleration and acceleration of the rotor to dislodge the accumulated more dense material from the inwardly facing surface, thereby to facilitate the removal of said more dense material from the rotor.

2. A method according to claim 1 wherein the rotor rotates about a generally upright axis and material which has been dislodged from the inwardly facing surface drops in a generally axial direction through an open lower end of the rotor.

3. A method of operating a centrifuge comprising the steps of passing a suspension containing a less dense and a more dense material into a rotor of the centrifuge, rotating the rotor in one direction so that the more dense material separates from the less dense material to accumulate on an inwardly facing surface of the rotor and, when the more dense material has accumulated in this manner, causing a rapid deceleration of the rotor and then rotation of the rotor in the opposite direction to the initial direction of rotation, thereby to facilitate the removal of said more dense material from the rotor.

* * * * *

UNITED STATES PATENT AND TRADEMARK OFFICE

CERTIFICATE OF CORRECTION

PATENT NO. : 4,534,755

DATED : August 13, 1985

INVENTOR(S) : Colin Calvert & Peter Cox-Smith

It is certified that error appears in the above-identified patent and that said Letters Patent is hereby corrected as shown below:

Correct spelling of Assignee's name from "Hoccum Developments Limited to --Hoccom Developments Limited--.

Signed and Sealed this

*Twenty-sixth* Day of *November 1985*

[SEAL]

*Attest:*

DONALD J. QUIGG

*Attesting Officer* *Commissioner of Patents and Trademarks*